(12) United States Patent
Saxena

(10) Patent No.: US 10,725,976 B2
(45) Date of Patent: *Jul. 28, 2020

(54) FAST RECOVERY USING SELF-DESCRIBING REPLICA FILES IN A DISTRIBUTED STORAGE SYSTEM

(71) Applicant: International Business Machines Corporation, Armonk, NY (US)

(72) Inventor: Mohit Saxena, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,285

(22) Filed: Oct. 5, 2018

(65) Prior Publication Data

US 2019/0050421 A1 Feb. 14, 2019

Related U.S. Application Data

(63) Continuation of application No. 14/860,771, filed on Sep. 22, 2015, now Pat. No. 10,127,243.

(51) Int. Cl.
| | | |
|---|---|---|
| *G06F 11/00* | (2006.01) | |
| *G06F 16/178* | (2019.01) | |
| *G06F 11/16* | (2006.01) | |
| *G06F 11/14* | (2006.01) | |
| *G06F 16/11* | (2019.01) | |
| *G06F 16/13* | (2019.01) | |
| *G06F 11/20* | (2006.01) | |

(52) U.S. Cl.
CPC ........ *G06F 16/178* (2019.01); *G06F 11/1435* (2013.01); *G06F 11/1469* (2013.01); *G06F 11/1662* (2013.01); *G06F 16/122* (2019.01); *G06F 16/13* (2019.01); *G06F 11/2094* (2013.01); *G06F 2201/80* (2013.01); *G06F 2201/805* (2013.01); *G06F 2201/85* (2013.01)

(58) Field of Classification Search
CPC ............ G06F 11/1402; G06F 11/1446; G06F 11/1448; G06F 11/1458
USPC .......................................................... 714/15
See application file for complete search history.

(56) References Cited

U.S. PATENT DOCUMENTS

| 8,145,598 B2 | 3/2012 | Beaman et al. |
| 8,463,742 B1 | 6/2013 | Floyd et al. |

(Continued)

OTHER PUBLICATIONS

Slootmaekers, Romain and Nicolas Trangez, "Arakoon: A Distributed Consistent Key-Value Store," SIGPLAN Ocaml Users and Developers Workshop, vol. 62, Jul. 17, 2012.

(Continued)

*Primary Examiner* — Sarai E Butler
(74) *Attorney, Agent, or Firm* — Lieberman & Brandsdorfer, LLC

(57) ABSTRACT

The embodiments relate to performing a write operation in a filesystem. Replica files embedded with respective sets of data are stored are on persistent storage local to replica nodes of the filesystem. The storage includes atomically updating the replica files to the replica nodes. Each set of data has information for self-characterizing each replica file. A map stored at persistent storage local to a remote node is updated. The map maintains information for identifying each replica file stored at each replica node.

20 Claims, 8 Drawing Sheets

(56) References Cited

U.S. PATENT DOCUMENTS

| | | | |
|---|---|---|---|
| 8,671,072 B1* | 3/2014 | Shah | G06F 3/0619 |
| | | | 707/610 |
| 8,990,162 B1 | 3/2015 | Kushwah et al. | |
| 9,009,111 B2 | 4/2015 | Vermeulen et al. | |
| 9,047,189 B1 | 6/2015 | Gupta et al. | |
| 2012/0284317 A1 | 11/2012 | Dalton | |
| 2013/0227201 A1 | 8/2013 | Talagala et al. | |
| 2014/0019413 A1* | 1/2014 | Braam | G06F 11/1471 |
| | | | 707/625 |
| 2014/0122428 A1* | 5/2014 | Zhou | G06F 11/202 |
| | | | 707/623 |
| 2015/0244795 A1 | 8/2015 | Cantwell et al. | |
| 2015/0347440 A1* | 12/2015 | Habouzit | G06F 16/1734 |
| | | | 707/824 |
| 2016/0092223 A1 | 3/2016 | Wang et al. | |
| 2016/0117337 A1 | 4/2016 | Aron et al. | |

OTHER PUBLICATIONS

List of IBM Patents or Applications Treated as Related, Oct. 2018.

* cited by examiner

FAST RECOVERY USING SELF-DESCRIBING REPLICA FILES IN A DISTRIBUTED STORAGE SYSTEM

CROSS-REFERENCE TO RELATED APPLICATION

The present application is a continuation patent application claiming the benefit of U.S. patent application Ser. No. 14/860,771, filed on Sep. 22, 2015, and titled "Fast Recovery Using Self-Describing Replica Files In A Distributed Storage System" now pending, the entire contents of which are hereby incorporated by reference.

BACKGROUND

The embodiments described herein relate generally to replica files stored at replica nodes in a filesystem. More specifically, the embodiments described herein relate to recovering from replica node failure using the stored replica nodes.

A filesystem is a term of art to refer to structure and logic rules for managing data (i.e., files). Specifically, filesystems are used to control how data is stored, retrieved, and updated. One type of filesystem is a distributed storage system, where replicated versions of a file are stored on multiple replica nodes. Distributed storage systems are used in scenarios in which high-performance data analytics is required over large datasets. Key challenges for managing such "big data" workloads within a distributed storage system include low-overhead durability or persistence to enable fast runtime performance, and enabling lower downtime for the distributed storage system during recovery from a failure at a replica node.

Traditionally, filesystem durability is provided through the use of logs, which are referred to herein as journals. Journals are used to keep track of intended changes to a filesystem such that, in the event of a filesystem crash or other failure, the filesystem can be returned to proper operation quicker and with a lower likelihood of corruption. However, utilizing journals in a distributed storage system results in poor performance and slow recovery. This is primarily because each node of the distributed storage system introduces a set of additional writes and cache flushes for ordering and persisting updates to storage. However, without journaling, filesystem recovery generally requires a complete scan of the address space of the storage system. This increases downtime because the filesystem cannot be mounted until a successful reconstruction of filesystem metadata during a filesystem consistency check for verifying crash consistency of lost updates. Additionally, the replicas of the distributed storage system need to be reconciled with each other to account for version consistency across the replica nodes. Both crash and version consistency checks result in performance loss and slow recovery for distributed storage systems. Moreover, the additional writes reduce the lifetime for wearable storage devices such as flash or solid-state drive memory technology.

SUMMARY

The aspects described herein include a method, a system, and a computer program product for providing fast durability and recovery for a filesystem subject to a crash or other failure.

According to one aspect, a method is provided for performing a write operation. The method atomically persists one or more replica files to one or more respective replica nodes in a filesystem. Each replica file includes chronology data and a metadata link to an inode of a parent file. In addition, a map stored on persistent storage local to a metadata node is atomically updated at a given replica node. The map maintains information for identifying, at a given replica node, each replica file having at least one block allocated at the given replica node.

According to another aspect, a computer program product is provided to perform a write operation. The computer program product includes a computer-readable storage device having program code embodied therewith. The program code is executable by a processing unit to atomically persist one or more replica files to one or more respective replica nodes in a filesystem. Each replica file includes chronology data and a metadata link to an inode of a parent file. In addition, program code is provided to atomically update a map stored on persistent storage local to a metadata node at a given replica node. The map maintains information for identifying, at a given replica node, each replica file having at least one block allocated at the given replica node.

According to yet another aspect, a system is provided to perform a write operation. The system includes a processing unit in communication with memory. The system further includes a metadata node having local persistent storage and at least one replica node have local persistent storage. A write manager is provided in communication with the processing unit. The write manager functions to perform a write operation. More specifically, the write manager atomically persist one or more replica files to one or more respective replica nodes in a filesystem. Each replica file includes chronology data and a metadata link to an inode of a parent file. In addition, the write manager atomically updates a map stored on persistent storage local to a metadata node at a given replica node. The map maintains information to identify, at a given replica node, each replica file having at least one block allocated at the given replica node.

Other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not all embodiments, unless otherwise explicitly indicated.

DETAILED DESCRIPTION

It will be readily understood that the components of the embodiments described herein, as generally described and illustrated in the Figures herein, may be arranged and designed in a wide variety of different configurations. Thus, the following detailed description of the embodiments of the method, computer program product, and system, as presented in the Figures, is not intended to limit the scope of the claims, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments described herein will be best understood by reference to the drawings, wherein like parts are designated by like numerals throughout. The following description is intended only by way of example, and simply illustrates certain selected embodiments of devices, systems, and processes that are consistent with the claims herein.

Figure 1:
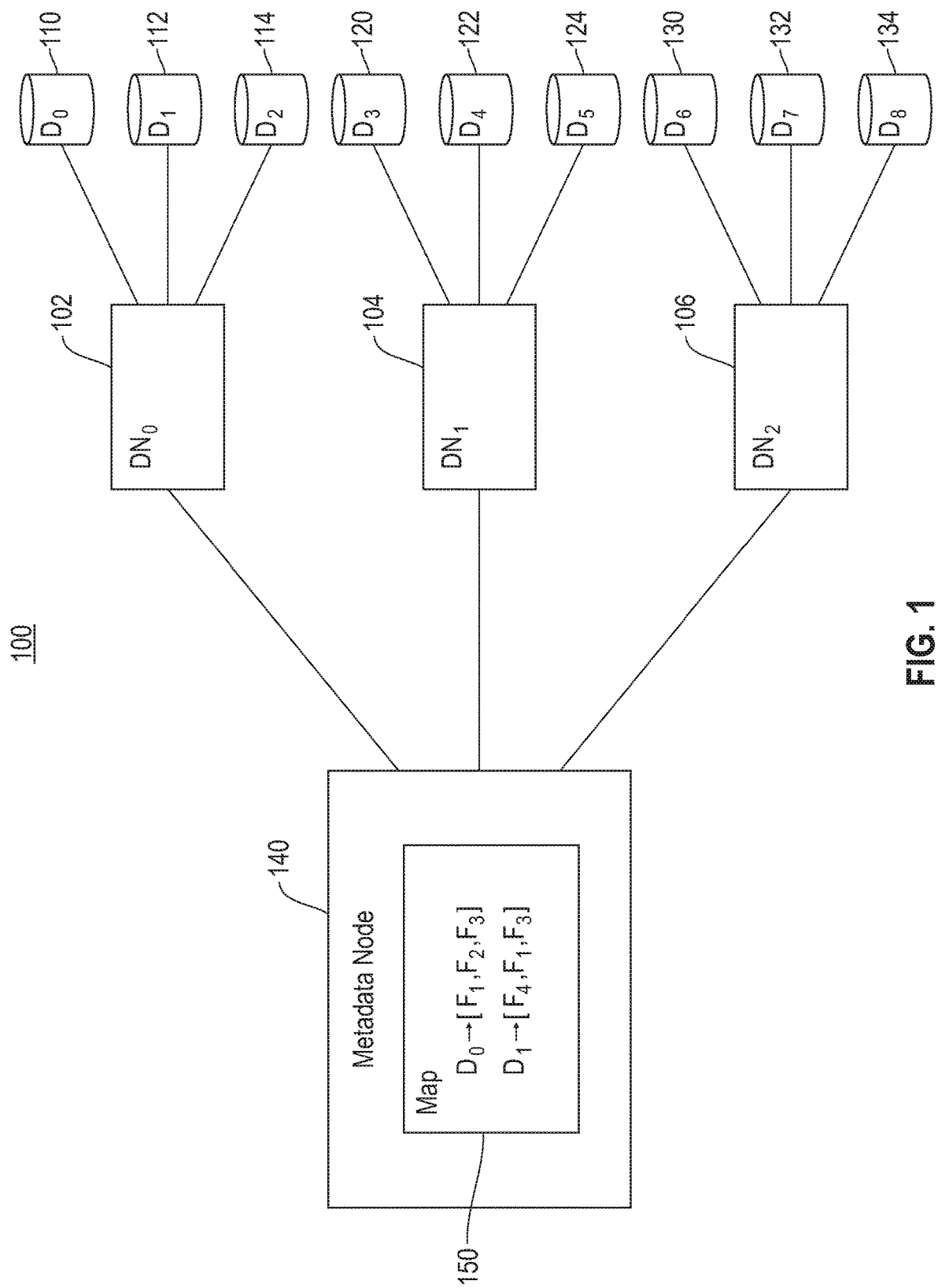
FIG. 1 depicts a block diagram illustrating a relationship between a metadata node maintaining a disk-to-file map and replica nodes of a filesystem, according to an embodiment.

FIG. 1 depicts a block diagram (100) illustrating nodes of an exemplary filesystem. In this example, three data nodes (102), (104), and (106) are shown. Each data node (102)-(106) has persistent storage local to each respective data node (102)-(106). As shown, data node (102) is shown having local persistent storage comprising disks $D_0$ (110), $D_1$ (112), and $D_2$ (114). Data node (104) is shown having local persistent storage comprising disks $D_3$ (120), $D_4$ (122), and $D_5$ (124). Data node (106) is shown having local persistent storage comprising disks $D_6$ (130), $D_7$ (132), and $D_8$ (134). It is to be understood that the number of nodes and disks is not to be limited, and it is to be appreciated that filesystems in alternative embodiments may have any number of data nodes and/or disks associated with local persistent storage. A detailed description of the performance of the write operation is provided below with reference to FIG. 3.

The filesystem also includes a metadata node (140). As shown, a map (150) is stored at the metadata node (140). In one embodiment, the map (150) is a disk-to-file map that tracks the mapping between disks and files on different data nodes and maintains information for identifying a location of files on each disk. Specifically, given a disk, the map (150) has a listing of all of the files having at least one block located on that disk. For example, as shown in FIG. 1, given disk $D_0$ (110), the map (150) lists files including $F_1$, $F_2$, and $F_3$. As further shown in FIG. 1, given disk $D_1$ (112), the map (150) lists files including $F_4$, $F_1$, and $F_3$. The map (150) may be used to locate all of the files for which replicas need to be reconciled for recovering data as a result of a failure of at least one data node (102)-(106). A detailed description of the recovery process is provided below with reference to FIG. 4.

Figure 2:
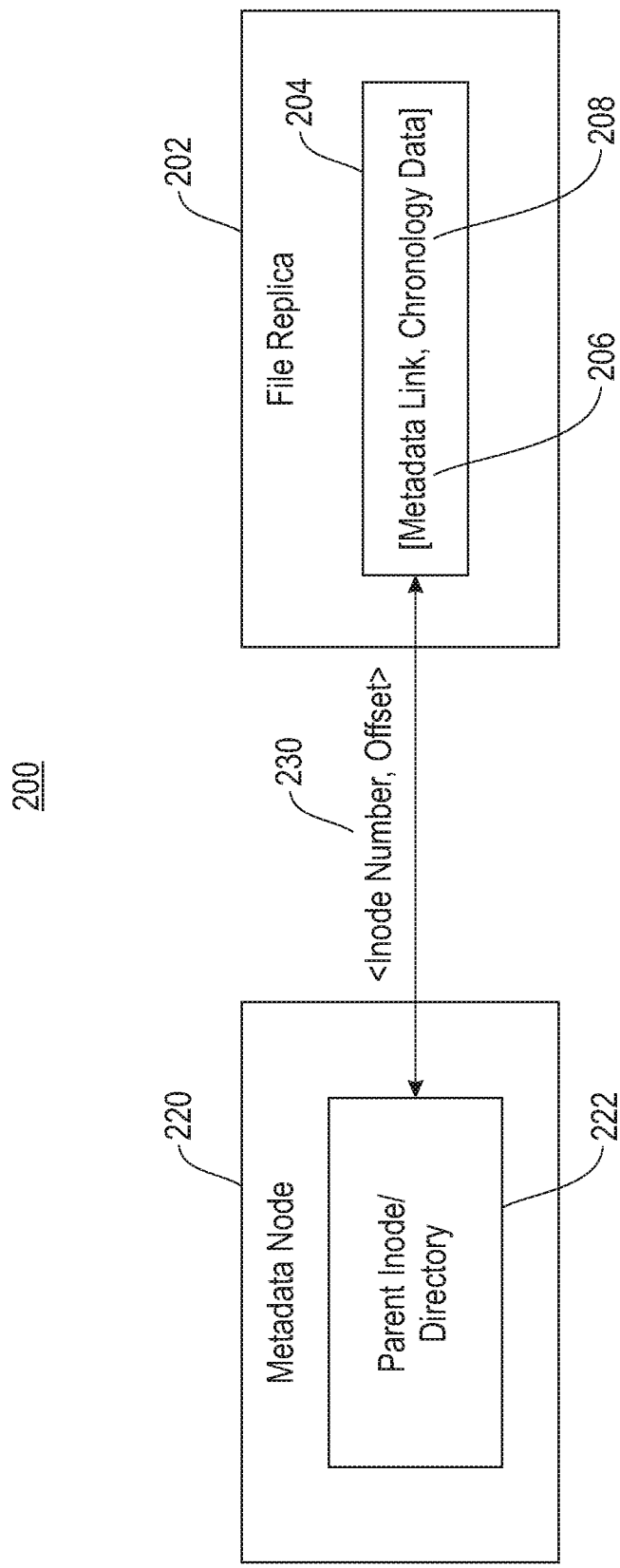
FIG. 2 depicts a block diagram illustrating a metadata link established between a parent file inode and a replica file having self-characterizing data, according to an embodiment.

With reference to FIG. 2, a block diagram (200) is provided illustrating an exemplary replica file and parent file inode. File replica (202) is shown having additional pieces of information, or a set of data (204), associated with the replica file. In one embodiment, the set of data includes a metadata link (206) and chronology data (208). The metadata link (206) provides the identity of the metadata block in the filesystem namespace pointing to the parent file inode or directory (222) in the metadata node (220), or the identity of the parent metadata block pointing to a replica metadata block. In one embodiment, the metadata link may further include the inode number and the offset (230) of the data node in the local filesystem namespace.

Essentially, a self-describing replica describes the inode number of the metadata block or a combination of the distributed filesystem inode number and the local filesystem inode number, and the corresponding block offset in the inode of the parent file. Similarly, a self-describing replica of a metadata block (e.g., the directory block or inode block) points to the inode number of the parent metadata blocks. The root directory is considered to be located at a fixed location on disk and does not require a metadata link.

The chronology data is associated with the last modified time corresponding to the last update. As shown and described in FIG. 2, the chronology data may be a timestamp. The timestamp corresponds to the time of the last update or of the replica file at its corresponding data node. However, in one embodiment, any other type of sequence number or value, such as a version number, may be used as chronology data. The embodiments described herein are not limited to the use of a timestamp as chronology data. Accordingly, the set of data (204) embedded in the replica file (202) characterizes the replica file (202), and in one embodiment, the replica file (202) may be referred to as a self-describing replica.

Figure 3:
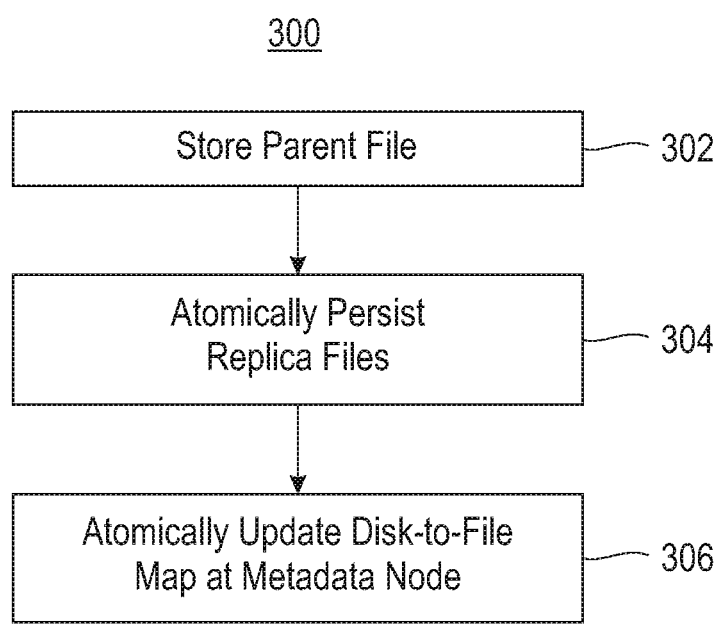
FIG. 3 depicts a flow chart illustrating a process for performing atomic updates of self-describing replicas during a write operation, according to an embodiment.

With reference to FIG. 3, a flow chart (300) is provided illustrating an exemplary performance of an atomic write operation within a filesystem. In one embodiment, the filesystem is a distributed storage system. A parent file is stored on persistent storage local to a data node of the distributed storage system (302). The data node storing the parent file at step (302) may be referred to as a parent node. One or more parent file replicas, hereinafter referred to as replica file(s), are atomically persisted on persistent storage local to respective data nodes of the distributed storage system (304). In one embodiment, each replica file is embedded with a respective set of data containing information for self-characterizing each respective replica file. The set of data may include chronology data and a metadata link to an inode of the parent file, as discussed above with reference to FIG. 2. In addition, the disk-to-file map located local to the metadata node, as shown and described in FIG. 1, is atomically updated with the replica file data (306). The data node(s) persisting the replica file(s) at step (304) may be referred to as replica node(s).

The self-describing replicas described above possess the property that they can be recovered without replaying a journal for crash consistency, or performing a full filesystem scan for version consistency. Instead of performing these operations, the recovery process utilizes the embedded set of data of the self-describing replicas (i.e., the associated metadata link and the chronology data) to verify the consistency and version of the replica stored at a failed node. Accordingly, the atomic write process described in FIG. 3 eliminates the need for multiple journal writes and cache-flushes with respect to providing crash consistency and recovery, as will be discussed herein below with reference to FIG. 4.

The atomic update process shown and described above with reference to FIG. 3 allows for the identification of files stored at nodes throughout the filesystem. In one embodiment, the files in the nodes may be hierarchically organized under a root node. In this scenario, a parent file in the file hierarchy (i.e., parent file inode) may be identified by using the embedded data in conjunction with the disk-to-file map. Accordingly, the atomic update process shown and described above with reference to FIG. 3 avoids a double allocation of a block by using the metadata link and chronology data embedded in the self-describing replicas.

Figure 4:
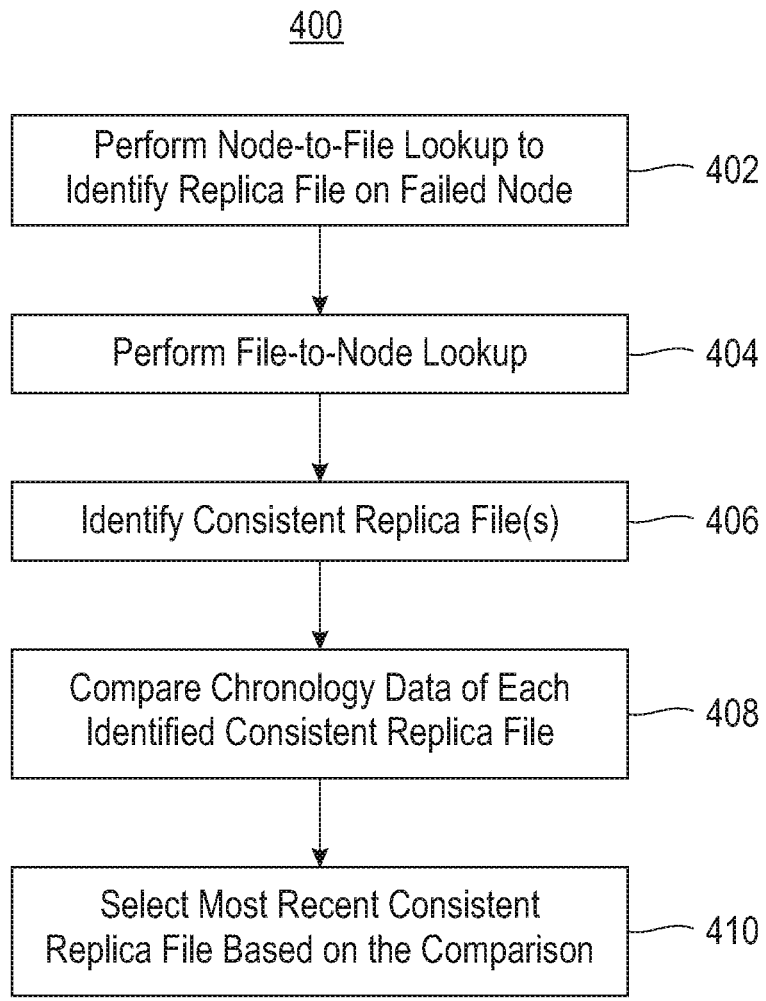
FIG. 4 depicts a flow chart illustrating a process for locating self-describing replicas within a filesystem, according to an embodiment.

With reference to FIG. 4, a flow chart (400) is provided illustrating an exemplary process for locating self-describing replica files stored at replica nodes within a filesystem. In one embodiment, the replica files may be located in order to perform a reconciliation of one or more replica files following a failure at a replica node. In such an event, a node-to-file lookup is performed with respect to the failed replica node using the disk-to-file map (402). Specifically, a reverse lookup using the disk-to-file map is performed to identify the replica files whose blocks are located on the failed disk or data node. Step (402) is performed in order to construct a set of stale files that may need to be updated due to the node failure. In a traditional distributed storage system, a full filesystem check scan is used to identify lost or stale blocks on a failed disk or data node. The identification of replica files using the disk-to-file map at step (402) significantly reduces the recovery time associated with the full filesystem check by avoiding the need to scan the entire distributed filesystem namespace to construct this set of files to be recovered.

For the sake of simplicity, the term "first replica file" will be used herein to refer to an exemplary replica persisting at the failed node. The first replica file has a first embedded set of data, including first chronology data and an associated first metadata link. It is to be understood that the embodiments described herein are not limited solely to failed replica nodes having one replica file persisted thereon, and it is to be appreciated that in alternative embodiments, a plurality of replica files persisted at a failed node may be recovered pursuant to the process discussed herein.

A file-to-node lookup using the disk-to-file map is performed to locate one or more other replica files corresponding to the parent file associated with the first replica file (404). From the located replica file(s), one or more consistent replica files are identified (406). The identification at step (406) includes a comparison of an address in the inode of the parent file with the metadata link(s) of the located replica file(s). The chronology data among the identified consistent replica files are compared (408). The comparison at step (408) is performed in order to determine the chronology data associated with a most recent replica update. A most recent replica file, hereinafter referred to as a second replica file, is selected in response to determining that second chronology data embedded in the second replica file is associated with the most recent update (410). Accordingly, step (402) is performed in order to identify one or more replica files located at a failed nodes, and steps (404)-(410) are performed in order to identify a most recent and consistent replica file persisting at a non-failed replica node.

Figure 5:
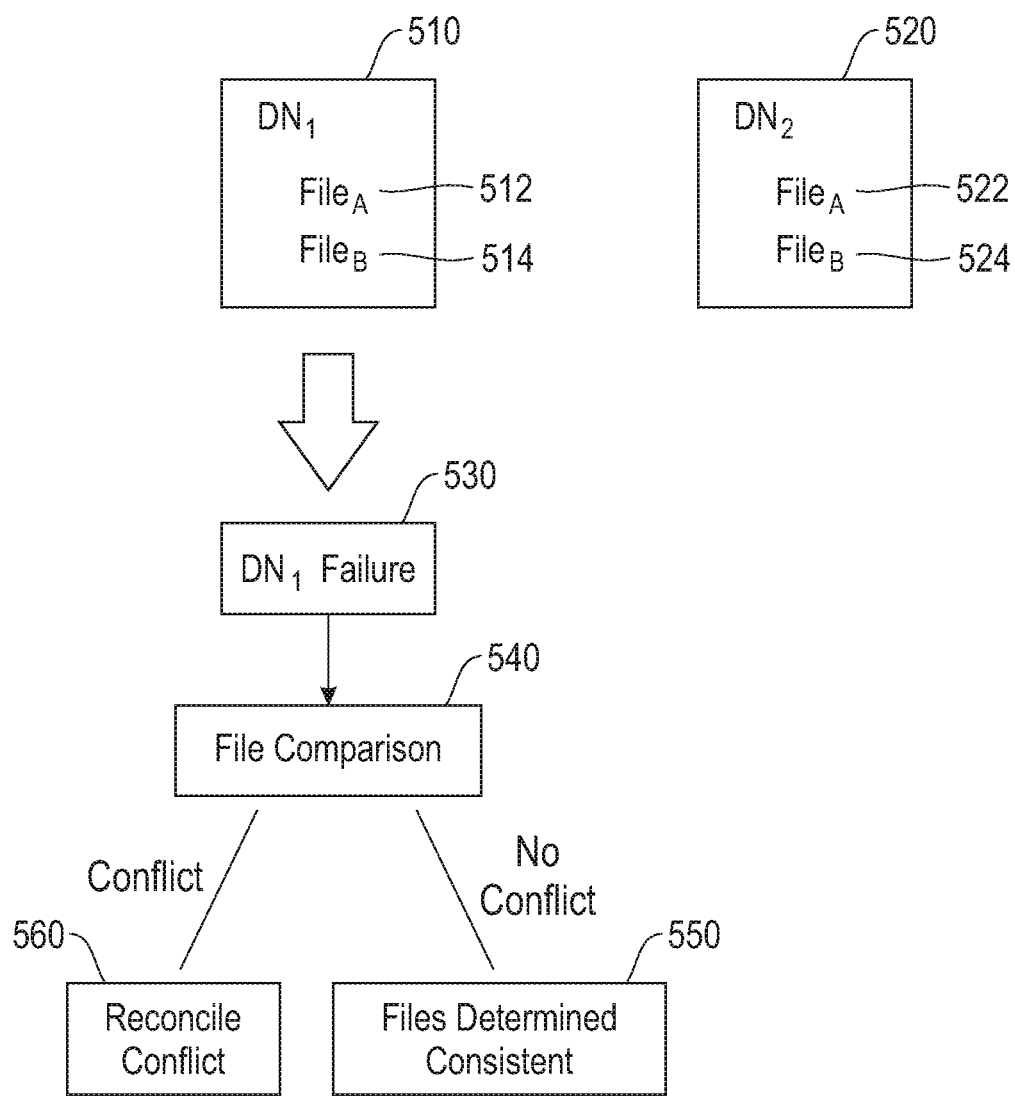
FIG. 5 depicts a block diagram illustrating a process for reconciling a replica node conflict following replica node failure, according to an embodiment.

Failure of a replica node can occur for various reasons and during different stages of replication and file updates. Referring to FIG. 5, a flow diagram (500) is provided illustrating a process for resolving a conflict discovered between self-describing replicas, such as the self-describing replicas located pursuant to the method described with reference to FIG. 4. As shown in this example, there are two replica nodes, $DN_1$ (510) and $DN_2$ (520). Each of the replica nodes are shown containing two replica files, referred to herein as $file_A$ and $file_B$. As shown, $DN_1$ (510) includes $file_A$ (512) and $file_B$ (514), and $DN_2$ (520) includes $file_A$ (522) and $file_B$ (524). In the example shown herein, a node failure is shown at (530) to occur at $DN_1$ (510). Failure may occur for various reasons, and as shown herein, the replica node failure at (530) is a crash of the node.

The chronology data embedded in the self-describing replica, such as a time-stamp or a sequence number indicating how recent the replica file was updated, allows for the reconciliation of any conflicts during the recovery process. More specifically, when the crash on replica node (510) is resolved and the node is in service, a comparison of the files is conducted (540). This comparison at (540) includes a comparison of the associated chronology data present in the self-describing replica. The chronology data is compared in order to verify that the replica files on $DN_1$ (510) are stale. In other words, the verification follows the last-writer-wins rule to define the replica files on $DN_2$ (520) as fresh. The comparison at (540) further includes a comparison of the replica files on $DN_1$ (510) and $DN_2$ (520) to discover the presence of a data conflict corresponding to a replica file.

If the comparison at (540) results in no data conflict between the files, then this is an indication that the files have not been updated since the time of the crash and the files are determined to be consistent (550). However, if the comparison at (540) results in a conflict then the conflict is reconciled (560). The reconciliation at (560) includes updating the stale replica at $DN_1$ (510) based on the corresponding fresh replica i.e., the most recent replica, at $DN_2$ (520). In one embodiment, the reconciliation at (560) is performed by propagating changes from the embedded data of the fresh replica to update the embedded data of stale replica. Specifically, the chronology data and metadata link of the stale replica are updated based on the chronology data and metadata link of the fresh replica. The propagation of the changes may include, but is not limited to, creating, deleting, or modifying the stale replica.

Figure 6:
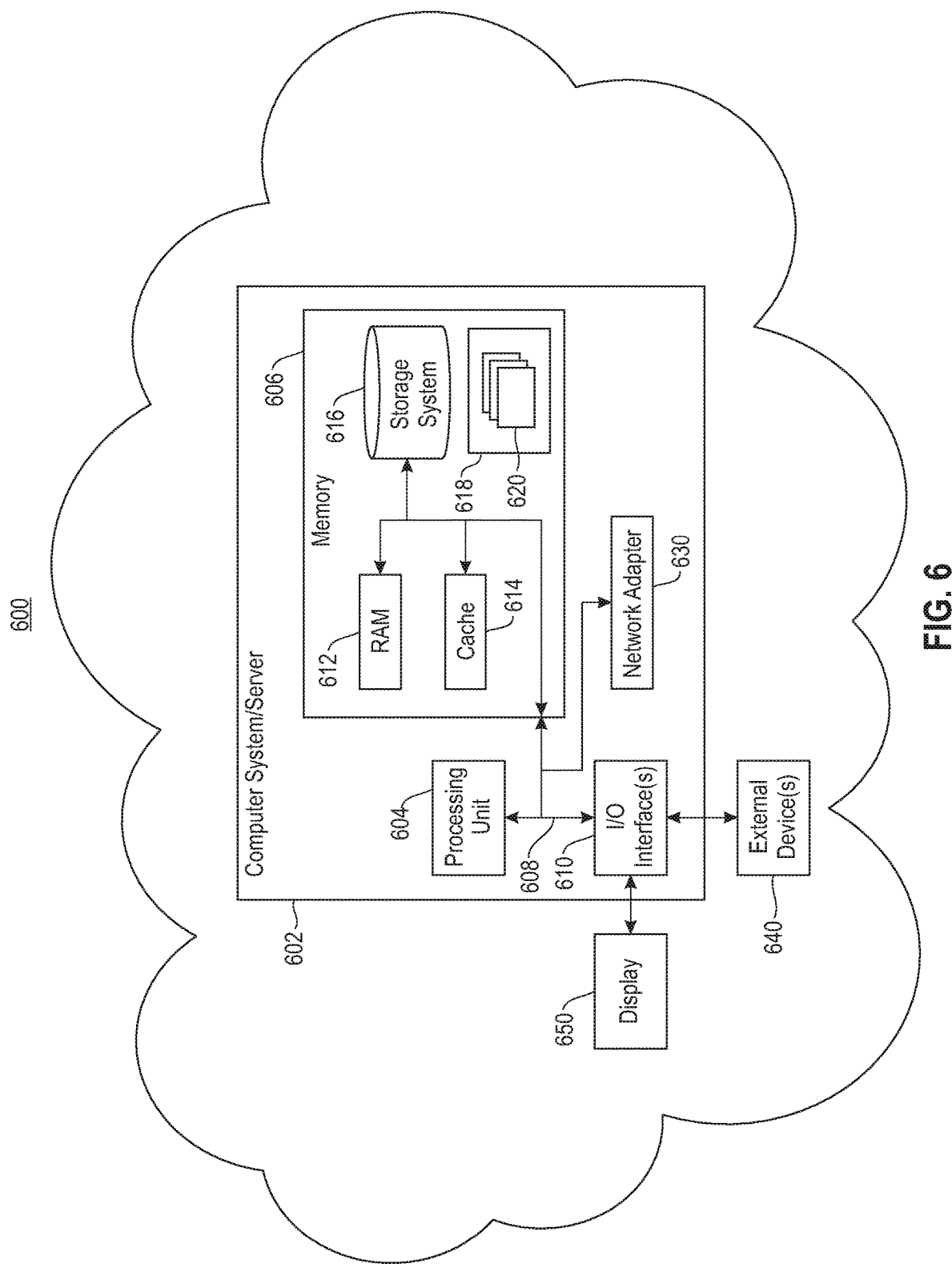
FIG. 6 depicts a schematic example of a system for performing the processes of FIGS. 3-5, according to an embodiment.

With reference to FIG. 6, a block diagram (600) is provided illustrating an example of a computer system/server (602), hereinafter referred to as a host (602) for performing a write operation and recovering from replica node failure, as described above with respect to FIGS. 3 and 4. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and filesystems (e.g., distributed storage environments and distributed cloud computing environments) that include any of the above systems or devices, and the like.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, host (602) is shown in the form of a general-purpose computing device. The components of host (602) may include, but are not limited to, one or more processors or processing units (604), a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (502) and it includes both volatile and non-volatile media, removable and non-removable media.

Memory (606) can include computer system readable media in the form of volatile memory, such as random access memory (RAM) (612) and/or cache memory (614). Host (602) further includes other removable/non-removable, volatile/non-volatile computer system storage media. By way of example only, storage system (616) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces. As will be further depicted and described below, memory (606) may include at least one program product having a set (e.g., at least one) of program modules that are configured to carry out the functions of the embodiments described above with reference to FIGS. 1-5.

Program/utility (618), having a set (at least one) of program modules (620), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (620) generally carry out the functions and/or methodologies of embodiments as described herein. For example, the set of program modules (620) may include at least one module that is configured to perform a write operation, and recover from node failure, in accordance with the embodiments described herein.

Host (602) may also communicate with one or more external devices (640), such as a keyboard, a pointing device, etc.; a display (650); one or more devices that enable a user to interact with host (602); and/or any devices (e.g., network card, modem, etc.) that enable host (502) to communicate with one or more other computing devices. Such communication can occur via Input/Output (I/O) interface(s) (610). Still yet, host (602) can communicate with one or more networks such as a local area network (LAN), a general wide area network (WAN), and/or a public network (e.g., the Internet) via network adapter (630). As depicted, network adapter (630) communicates with the other components of host (602) via bus (608). In one embodiment, a filesystem, such as a distributed storage system, may be in communication with the host (602) via the I/O interface (610) or via the network adapter (630). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In one embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
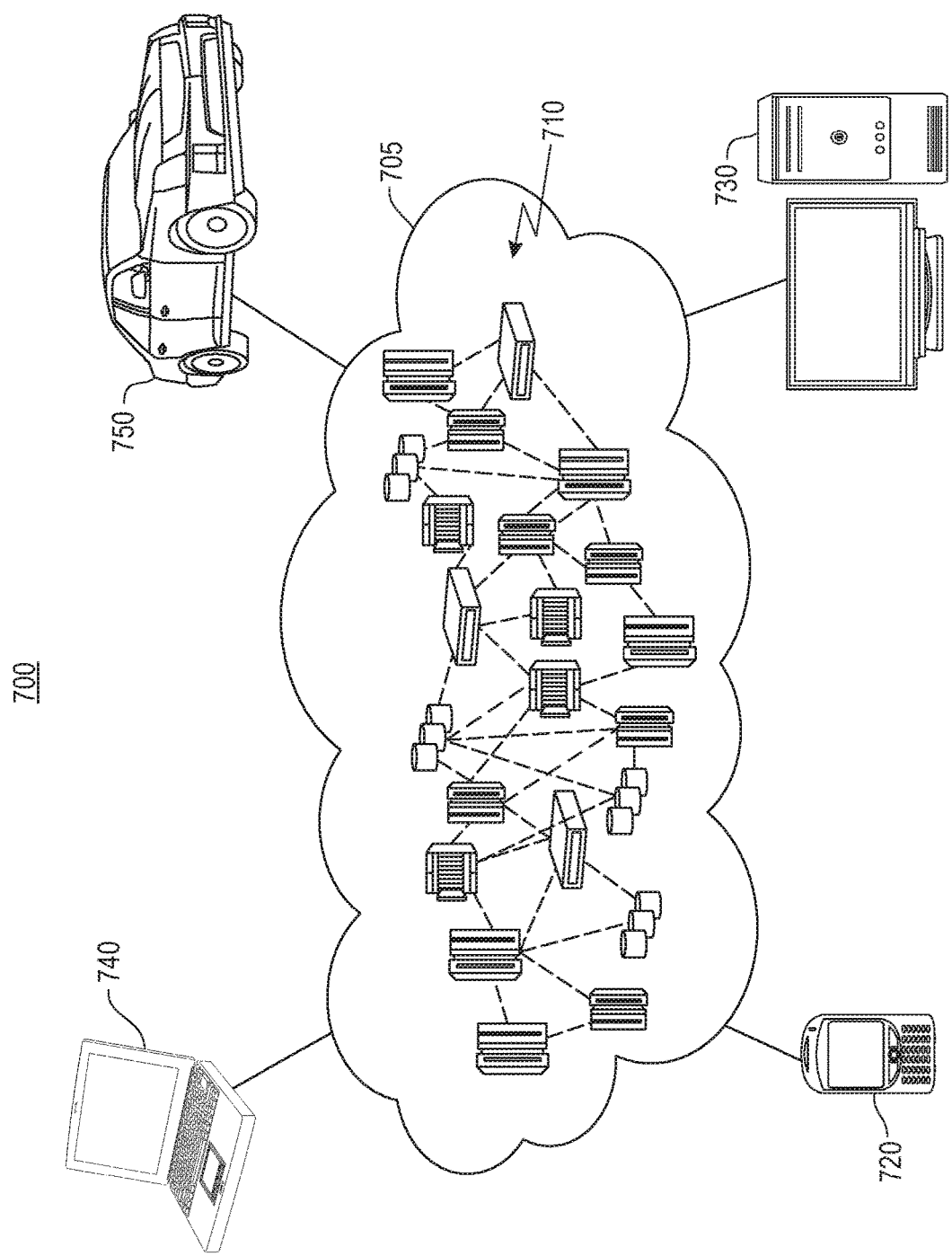
FIG. 7 depicts a block diagram illustrative of a cloud computing environment, according to an embodiment.

Referring now to FIG. 7, an illustrative cloud computing network (700). As shown, cloud computing network (700) includes a cloud computing environment (705) having one or more cloud computing nodes (710) with which local computing devices used by cloud consumers may communicate. Examples of these local computing devices include, but are not limited to, personal digital assistant (PDA) or cellular telephone (720), desktop computer (730), laptop computer (740), and/or automobile computer system (750). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (720)-(750) shown in FIG. 7 are intended to be illustrative only and that the cloud computing environment (705) can communicate with any type of computerized device over any type of network and/or network addressable connection (e.g., using a web browser).

Figure 8:
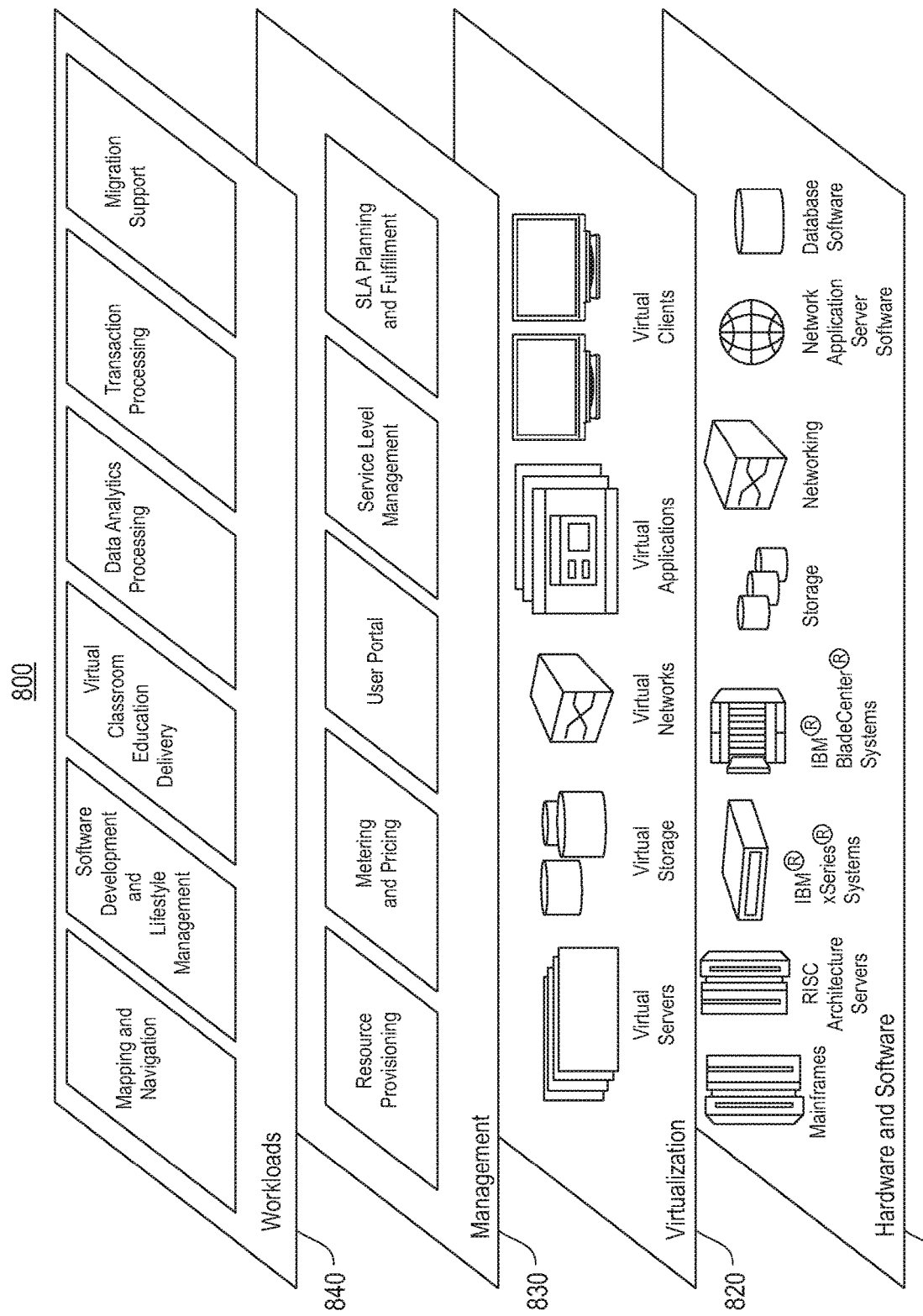
FIG. 8 depicts a block diagram illustrating a set of functional abstraction model layers provided by the cloud computing environment, according to an embodiment.

Referring now to FIG. 8, a set of functional abstraction layers provided by cloud computing network (700) is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840). The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and grammatical pattern organization support within the cloud computing environment.

In the shared pool of configurable computer resources described herein, hereinafter referred to as a cloud computing environment, files may be shared among users within multiple data centers, also referred to herein as data sites. A series of mechanisms are provided within the shared pool to provide decision making controls for access to one or more records based upon associated record access and inherent characteristics of privacy. Three knowledge bases are employed with respect to consent management, including importance, sensitivity, and relevance. Analytical techniques employ the knowledge bases to assist with making access control decisions.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The corresponding structures, materials, acts, and equivalents of all means or step plus function elements in the claims below are intended to include any structure, material, or act for performing the function in combination with other claimed elements as specifically claimed. The description of the embodiments herein has been presented for purposes of illustration and description, but is not intended to be exhaustive or limited to the embodiments in the forms disclosed. Many modifications and variations will be apparent to those of ordinary skill in the art without departing from the scope and spirit of the embodiments described herein. The embodiments were chosen and described in order to best explain the principles and the practical application, and to enable others of ordinary skill in the art to understand the various embodiments with various modifications as are suited to the particular use contemplated. Accordingly, the implementation of performing a write operation described herein stores a parent file, atomically persists one or more replica files embedded with respective sets of data for self-characterizing each respective replica file, and atomically updates a disk-to-file map for identifying each replica file having data stored at a given replica node, thereby allowing for efficient recovery from replica node failure.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

What is claimed is:

1. A method for performing a write operation, the method comprising:
   atomically persisting one or more replica files to one or more respective replica nodes in a filesystem, wherein each replica file comprising: chronology data and a metadata link to an inode of a parent file; and
   atomically updating a map, wherein the map maintains information for identifying, at a given replica node, each replica file having at least one block allocated at the given replica node.

2. The method of claim 1, further comprising performing a reconciliation of one or more of the replica files following a failure at the given replica node.

3. The method of claim 2, wherein performing the reconciliation comprises performing a node-to-file lookup with respect to the failed replica node using the map.

4. The method of claim 3, wherein performing a node-to-file lookup comprises performing a reverse lookup using the map to identify each replica file located on the failed replica node.

5. The method of claim 1, further comprising locating at least one other replica file corresponding to the parent file associated with at least one of the replica files located at the failed replica node.

6. The method of claim 5, further comprising performing an address comparison between the parent file and the located replica files.

7. The method of claim 6, wherein performing an address comparison comprises comparing an address in the inode of the parent file with at least one metadata link of the located replica files.

8. The method of claim 1, further comprising:
   comparing one or more replica files on a first replica file node and one or more replica files on a second replica file node to determine a data conflict corresponding to at least one of the replica files; and
   reconciling the data conflict through updating at least one of the replica files on the first replica file node with data from at least one of the replica files on the second replica file node.

9. A computer program product comprising a computer readable storage device having program code embodied therewith, the program code executable by a processing unit to:
   atomically persist one or more replica files to one or more respective replica nodes in a filesystem, wherein each replica file comprising: chronology data and a metadata link to an inode of a parent file; and
   atomically update a map, wherein the map maintains information for identifying, at a given replica node, each replica file having at least one block allocated at the given replica node.

10. The computer program product of claim 9, further comprising program code to perform a reconciliation of one or more of the replica files following a failure at the given replica node.

11. The computer program product of claim 10, wherein the reconciliation comprises program code to perform a node-to-file lookup with respect to the failed replica node using the map.

12. The computer program product of claim 9, further comprising program code to locate at least one other replica file corresponding to the parent file associated with at least one of the replica files located at the failed replica node.

13. The computer program product of claim 12, further comprising program code to perform an address comparison between the parent file and the located replica files.

14. The computer program product of claim 9, further comprising further comprising program code to:
compare one or more replica files on a first replica file node and one or more replica files on a second replica file node to determine a data conflict corresponding to at least one of the replica files; and
reconcile the data conflict through updating at least one of the replica files on the first replica file node with data from at least one of the replica files on the second replica file node.

15. A system comprising:
a processing unit in communication with memory;
a metadata node in communication with the processing unit, the metadata node having local persistent storage;
one or more replica nodes in communication with the metadata node, each replica node having local persistent storage;
a write manager in communication with the processing unit, wherein the write manager performs a write operation comprising:
atomically persist one or more replica files to one or more respective replica nodes in a filesystem, wherein each replica file comprising: chronology data and a metadata link to an inode of a parent file; and
atomically update a map, wherein the map maintains information for identifying, at a given replica node, each replica file having at least one block allocated at the given replica node.

16. The system of claim 15, further comprising a recovery manager in communication with the processing unit, wherein the recovery manager is configured to recover from a failure at a replica node, including perform a reconciliation of one or more of the replica files following a failure at the given replica node.

17. The system of claim 16, wherein the reconciliation further comprises the recovery manager to perform a node-to-file lookup with respect to the failed replica node using the map.

18. The system of claim 16, further comprising the recovery manager to locate at least one other replica file corresponding to the parent file associated with at least one of the replica files located at the failed replica node.

19. The system of claim 18, further comprising the recovery manager to perform an address comparison between the parent file and the located replica files.

20. The system of claim 16, further comprising the recovery manager to:
compare one or more replica files on a first replica file node and one or more replica files on a second replica file node to determine a data conflict corresponding to at least one of the replica files; and
reconcile the data conflict through updating at least one of the replica files on the first replica file node with data from at least one of the replica files on the second replica file node.

* * * * *